No. 877,698. PATENTED JAN. 28, 1908.
A. C. & G. Q. BEDORTHA.
TREATMENT OF TOBACCO.
APPLICATION FILED AUG. 18, 1906.
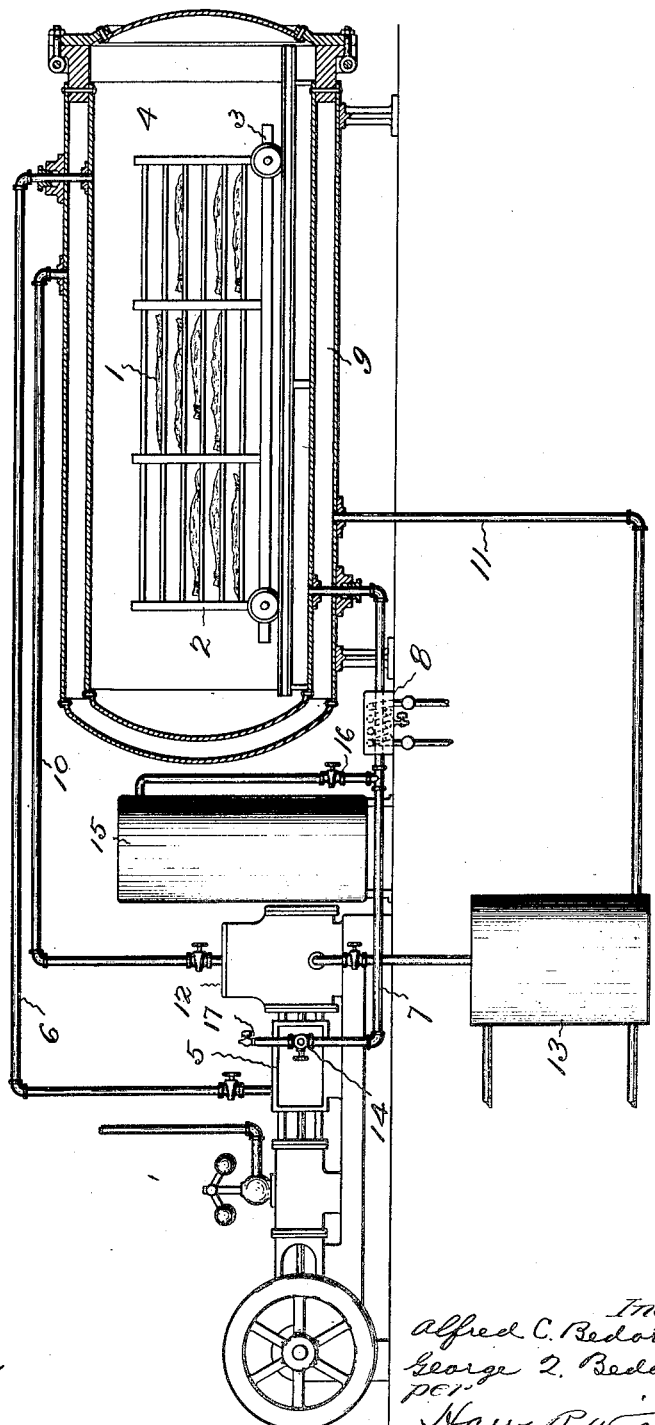

UNITED STATES PATENT OFFICE.

ALFRED C. BEDORTHA AND GEORGE Q. BEDORTHA, OF WINDSOR, CONNECTICUT.

TREATMENT OF TOBACCO.

No. 877,698.     Specification of Letters Patent.     Patented Jan. 28, 1908.

Application filed August 18, 1906. Serial No. 331,152.

*To all whom it may concern:*

Be it known that we, ALFRED C. BEDORTHA and GEORGE Q. BEDORTHA, citizens of the United States, residing at Windsor, in the county of Hartford and State of Connecticut, have invented a new and useful Treatment of Tobacco, of which the following is a specification.

This invention relates to a bacteriological treatment of tobacco whereby leaves having an inferior or less esteemed flavor are given another and more desirable flavor.

In order to attain the desired object it is first necessary to kill all the spores and bacteria originally existing on the leaves without impairing the texture or otherwise deleteriously affecting the leaves, after which the sterile leaves are supplied with such species of bacteria or cultures thereof as will impart the flavor craved, and then subjected to fermentation.

The present improvement relates more particularly to the steps which accomplish a complete and satisfactory sterilization of the leaves, in order that the bacteria which affect the final flavor may not be re-acted upon, deteriorated or degenerated by any of the original bacteria. In practicing this treatment leaves or bunches of tobacco leaves are loosened up, first by shaking and then by drying, after which they are placed in a sterilizer and fumigated with formaldehyde, then heated to remove all trace of the sterilizing medium, then supplied with the active bacteria cultures which control the final flavor or bouquet, and afterwards fermented. This treatment may be carried on by various forms of apparatus.

The accompanying drawing shows a sectional elevation of one form of apparatus which may be used for the purpose.

The hands or bunches of tobacco are shaken up as much as they can be safely to separate and loosen the folded leaves. They cannot be completely separated and unfolded by shaking without danger of damaging them, but it is necessary that they should be entirely separated and unfolded in order that the sterilizing medium may penetrate the folds and come in contact with the entire surface of every leaf. To accomplish the necessary separation the shaken leaves may be loosely laid on racks and placed in a chamber or kiln and dried by currents of warm air until the free moisture is expelled and evaporated and the folds of the leaves opened, or if desired the bunches of leaves 1 may be laid on a rack 2 carried by a truck 3 and rolled into a chamber 4 which can be tightly closed. This chamber is shown as connected with the air cylinder 5 of a steam vacuum and circulating pump, by pipes 6 and 7, one of which may pass through or open into a heater 8 that may be kept at the desired temperature by steam from any convenient source. With this apparatus air may be heated and circulated through the chamber until the leaves are thoroughly dry.

About the exterior of the chamber is a water jacket 9. This is shown as connected by pipes 10 and 11 with the circulating cylinder 12 of the pump. One of these pipes may pass through or open into a hot well 13 that may be heated in any convenient manner. By these means the temperature in the chamber may be kept uniformly at the required degree.

After the leaves have opened sufficiently to permit a free circulation of air and gas between them, formaldehyde is introduced into the chamber. This may be accomplished by turning the three-way cock 14 so as to close communication with the chamber through the pipe 7 and open the discharge of the vacuum cylinder to the atmosphere. Then when the pump is operated air will be withdrawn from the chamber. After the chamber has been exhausted sufficiently to create, say about a 20 inch or more vacuum, formaldehyde may be allowed to enter the chamber from a tank 15 that is connected with the pipe 7 by opening the valve 16. This will allow the formaldehyde to flow or be drawn from the tank into the partially exhausted chamber. When a suitable volume of formaldehyde, equal perhaps to 10 per cent. of the volume of the chamber at atmospheric pressure, has entered the chamber the cocks may be closed and the sterilizing medium allowed to act on the leaves.

After sufficient time has elapsed for the formaldehyde to permeate the folds and penetrate into the innermost recesses and pockets, so as to come in contact with the entire surface of each leaf, a pet cock 17 may be opened and air allowed to slowly enter, during which time the air and gas may be circulated through the chamber by the pump. To assist the formaldehyde to penetrate into the spaces between the leaves and into the pockets caused by the folding and crumpling of the leaves, it can if desired be subjected to a slight pressure when in the sterilizing chamber. To increase the activity of the sterilizing medium it may be warmed as it passes through the heater before entering the chamber which is kept at the required temperature by the heat of the hot water jacket.

When the tobacco is thoroughly sterilized the sterilizing medium is drawn off. During this time the tobacco is preferably heated so as to facilitate the removal. To effect this the tobacco may be placed in a kiln or may be left in the sterilizing chamber and hot air circulated through the chamber by the pump. After all traces of the formaldehyde have been removed the leaves are supplied by spraying or otherwise with the bacteria or cultures of the bacteria, which after fermentation will impart to the leaves the characteristics necessary to produce the aroma or bouquet desired, and then the leaves are fermented in the usual way.

The first drying of the leaves causes the folds to open without breaking and evaporates the moisture so that the formaldehyde can act quickly and surely upon every part of every leaf.

Formaldehyde applied to the leaves in this manner will kill all the original bacteria and spores without deleteriously affecting the final flavor which the tobacco has after the application of the prepared bacteria, and the heating of the tobacco as described will not destroy the texture or injure the leaves.

The invention claimed is:—

1. The treatment of tobacco, which consists in drying the leaves for separating them and expelling free moisture and then sterilizing the same by subjecting the dried and opened leaves to the action of formaldehyde under pressure higher than atmospheric pressure.

2. The treatment of tobacco which consists in drying the leaves for separating them and expelling free moisture, then sterilizing the same by subjecting the dried and opened leaves to the action of formaldehyde, and subjecting the sterilized leaves to current of heated air for driving off the sterilizing medium.

3. The treatment of tobacco which consists in drying the leaves for separating them and expelling free moisture, subjecting the dried and opened leaves to the action of formaldehyde, subjecting the sterilized leaves to current of heated air for driving off the sterilizing medium, and supplying the leaves with cultures of selected bacteria.

4. The treatment of tobacco which consists in drying the leaves for separating them and expelling free moisture, exhausting air from the dried and opened leaves and subjecting the leaves in the partial vacuum to the action of formaldehyde.

5. The treatment of tobacco which consists in drying the leaves for separating them and expelling free moisture, exhausting air from the dried and opened leaves, subjecting the leaves in the partial vacuum to the action of formaldehyde and adding air to the formaldehyde and at the same time circulating the air and the formaldehyde about the leaves.

6. The treatment of tobacco which consists in thoroughly drying the leaves, exhausting air from the leaves, subjecting the leaves in the partial vacuum to the action of formaldehyde, subjecting the leaves to currents of heated air, and supplying cultures of selected bacteria to the sterile leaves.

ALFRED C. BEDORTHA.
GEO. Q. BEDORTHA.

Witnesses:
  CHAS. T. WELCH,
  GEORGE R. MAUDE.